(12) United States Patent
Tan

(10) Patent No.: US 8,966,397 B2
(45) Date of Patent: *Feb. 24, 2015

(54) METHOD OF CONVERTING DIGITAL DATA

(75) Inventor: Joon Yong Wayne Tan, Singapore (SG)

(73) Assignee: T-Data Systems (S) Pte Ltd, Singapore (SG)

( * ) Notice: Subject to any disclaimer, the term of this patent is extended or adjusted under 35 U.S.C. 154(b) by 210 days.

This patent is subject to a terminal disclaimer.

(21) Appl. No.: 13/514,433

(22) PCT Filed: Jan. 19, 2010

(86) PCT No.: PCT/SG2010/000012
§ 371 (c)(1),
(2), (4) Date: Jun. 7, 2012

(87) PCT Pub. No.: WO2011/075078
PCT Pub. Date: Jun. 23, 2011

(65) Prior Publication Data
US 2012/0254796 A1 Oct. 4, 2012

(30) Foreign Application Priority Data

Dec. 16, 2009 (WO) ................ PCT/SG2009/000480

(51) Int. Cl.
*G06F 3/048* (2013.01)
*H04N 1/00* (2006.01)
*G06T 1/00* (2006.01)
*G06F 13/00* (2006.01)

(52) U.S. Cl.
CPC ............ *H04N 1/00347* (2013.01); *G06F 13/00* (2013.01); *G06T 1/00* (2013.01); *H04N 1/00204* (2013.01); *H04N 2201/0065* (2013.01); *H04N 2201/0084* (2013.01); *H04N 2201/0087* (2013.01)

USPC ............................ 715/810; 715/788; 715/864

(58) Field of Classification Search
CPC ........................................................ G06F 13/00
USPC ................................................ 715/864, 788
See application file for complete search history.

(56) References Cited

U.S. PATENT DOCUMENTS

| | | | |
|---|---|---|---|
| 6,385,597 B1 * | 5/2002 | Guenther et al. ............. | 705/410 |
| 6,539,169 B1 * | 3/2003 | Tsubaki et al. ............... | 386/241 |
| 7,423,683 B2 * | 9/2008 | Inoue et al. ............. | 348/333.02 |
| 7,657,064 B1 * | 2/2010 | Conwell ........................ | 382/105 |
| 7,827,508 B2 * | 11/2010 | Venturino ..................... | 715/864 |
| 8,024,669 B2 * | 9/2011 | Hitosuga ....................... | 715/835 |
| 8,504,772 B2 * | 8/2013 | Tan ................................ | 711/115 |
| 2004/0109059 A1 * | 6/2004 | Kawakita ...................... | 348/143 |
| 2004/0192380 A1 | 9/2004 | Chen | |
| 2006/0174148 A1 * | 8/2006 | Yang ............................ | 713/322 |
| 2006/0268125 A1 | 11/2006 | Teicher et al. | |
| 2007/0285420 A1 * | 12/2007 | Brown ......................... | 345/420 |
| 2008/0156882 A1 * | 7/2008 | Tsikos et al. ............. | 235/462.43 |
| 2009/0094392 A1 | 4/2009 | Sakurai | |
| 2011/0145464 A1 * | 6/2011 | Tan ............................... | 710/301 |
| 2011/0242335 A1 * | 10/2011 | Tan ............................ | 348/207.1 |
| 2012/0242845 A1 * | 9/2012 | Tan ............................ | 348/207.1 |
| 2012/0327268 A1 * | 12/2012 | Tan ......................... | 348/231.99 |

* cited by examiner

*Primary Examiner* — William Titcomb
(74) *Attorney, Agent, or Firm* — Renner Kenner Greive Bobak Taylor & Weber

(57) ABSTRACT

A method is disclosed to convert digital data using a memory card operatively engaged with an apparatus such as a digital camera having control buttons but that does not have a keyboard or keypad. The memory card comprises a central processor, a conversion module and a storage module. The method includes placing the apparatus in a predetermined mode; activating the conversion module in the memory card; selecting at least one file stored in the memory card; and converting the selected at least one file.

21 Claims, 4 Drawing Sheets

METHOD OF CONVERTING DIGITAL DATA

REFERENCE TO RELATED APPLICATIONS

Reference is made to our earlier international patent applications PCT/SG2008/000327 filed 4 Sep. 2008 for an invention entitled "Method and Apparatus Card for Wireless Digital Content Management", PCT/SG2009/000279 filed 12 Aug. 2009 for an invention entitled "Method and Memory Card for Wireless Digital Content Management" and PCT/SG2009/000461 filed 1 Dec. 2009 for an invention entitled "Memory Card and Method for Storage and Wireless Transceiving of Data" (our earlier applications"), the contents of which are hereby incorporated by reference as if disclosed herein in their entirety.

TECHNICAL FIELD

This invention relates to a method of converting or transforming digital data using a memory device such as, for example, a memory card and relates particularly, though not exclusively, to such a method able to be used when the memory device is operatively engaged with an apparatus that does not have a keyboard or keypad.

DEFINITIONS

Throughout this specification a reference to a digital camera is to be taken as including a reference to a digital camera, digital video camera, digital voice recorder, or digital diary.

Throughout this specification a reference to conversion of digital data is to be taken as including the transformation of digital data.

Throughout this specification a reference to a memory card is to be taken as including all portable memory devices using flash memory and that are configured to be operatively connected to a digital camera including when the digital camera is in use, the connection being a direct connection or an indirect connection. An indirect connection may include, but is not limited to, the use of an adapter. The adapter may include at least one functional component and/or functionality of the memory card.

BACKGROUND

Due to a lack of a key pad or keyboard, there is normally no authentication or security available for digital cameras, other than biometric security systems. This is inconvenient.

Also, files stored in digital cameras are often uploaded to web sites such as, for example, YouTube. With high resolution cameras this is not suitable due to the relatively low resolution required by such web sites. This normally requires the use of a computer to perform the uploading. This is inconvenient. Mobile/cellular telephones are also used to send images they have captured by MMS or other protocols. This takes a considerable time due to the high resolution and formats used. This is inconvenient.

SUMMARY

According to a first exemplary aspect there is provided a method to converting digital data using a memory card operatively engaged with an apparatus having control buttons but that does not have a keyboard or keypad, the memory card comprising a central processor, a conversion module and a storage module; the method comprising:

placing the apparatus in a predetermined mode;
activating the conversion module in the memory card;
selecting at least one file stored in the memory card; and
converting the selected at least one file.

According to another aspect there is provided a memory card for converting digital data when operatively engaged with an apparatus having control buttons but that does not have a keyboard or keypad, the memory card comprising a central processor, a conversion module and a storage module; the conversion module being configured to convert at least one file stored in the storage module when the apparatus is in a predetermined mode.

The memory card may further comprise a memory card unit and an adapter configured to receive therein the memory card unit. The adapter may be further configured to operatively engage the apparatus. The adapter may comprise at least one functional component and functionality of the memory card. The at least one functional component may comprise at least one of the central processor and a wireless transceiver module.

According to a further aspect there is provided a memory card adapter configured to receive therein for operative engagement therewith a memory card unit, the memory card adapter comprising at least one of a central processor and a wireless transceiver module The apparatus may be a digital camera. The conversion may be:

an image to text;
one format to another;
jpg to pdf;
pdf to jpg;
an image from one resolution to another;
a high resolution image to standard definition VGA resolution;
image to text for security; and
image to text for authentication.

The memory card may be configured to physically and operatively engage in and with the apparatus, and to operatively connect with an inbuilt processor of the apparatus; the operative connection being in the same manner as, and the inbuilt processor sees the memory card as, a normal memory card. The digital data may be: image data, audio data, image and audio data, video data, and audio and video data. A first index image file may be sent to the apparatus from the memory card. The first index image file may comprise a plurality of first menu items with each of the first menu items comprising an image. Control buttons of the apparatus may be used to select one menu item from the first menu items; the one menu item selected determining if the inbuilt processor is to be used to convert the digital data. The control buttons of the apparatus may able to be used to control the central processor only when the apparatus is in the predefined mode. The first index image file may be displayed on a screen of the apparatus. Upon the control buttons being used to select the one menu item of the first menu items, the inbuilt processor may send an instruction to the central processor. The instruction may contain an identifier of the one of the menu items. When the apparatus is in the predetermined mode and the one menu item is relevant for the conversion of the digital data, the central processor may treat the instruction as "select". The instruction may be "delete". The method may further comprise sending a second index image file from the memory card to the apparatus; the second index image comprising a second menu list. Each item of the second menu list may also be a separate image and may have its own identifier. The second menu list may comprise:

image to text;
one format to another;
jpg to pdf;
pdf to jpg;
image from one resolution to another;
high resolution image to standard definition VGA resolution;
image to text for security; and
image to text for authentication.

Upon a member of the second menu list being selected, a relevant conversion is activated and a further query may be raised to determine the file or files to be converted. Once the relevant file or files are selected, the relevant file or files may be extracted and converted. The digital data may comprise an image of at least one item written on a suitable writing surface. The memory card may convert the image data to text. The text may be processed and compared with a pre-loaded and stored at least one item for at least one of: authentication, and security, of at least one of the apparatus and the memory card.

The operative engagement may be direct or indirect. When the operative engagement is indirect the memory card may comprise a memory card unit and an adapter configured to receive therein the memory card unit. The adapter may be further configured to operatively engage the apparatus. The adapter may comprise at least one functional component and functionality of the memory card. The at least one functional component may comprise at least one of the central processor and a wireless transceiver module.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings.

In the drawings.

DETAILED DESCRIPTION OF THE EXEMPLARY EMBODIMENTS

The exemplary embodiment is method of converting data using a memory card, particularly when the memory card is operatively engaged with an apparatus that does not have a keyboard or keypad such as, for example, a digital camera. The operative engagement may be direct or indirect. The conversion may be of any nature including, but not limited to:
an image to text;
one format to another such as, for example, jpg to pdf or pdf to jpg;
an image from one resolution to another such as a high resolution image to standard definition VGA resolution for uploading to web sites such as YouTube;
and so forth.

The conversion of an image to text may be used for authentication and/or security.

As shown in FIGS. 1 to 5, there is a digital camera 100 having a slot 102 into which a memory card 200 is able to be inserted and removed in the usual manner for direct operative engagement.

Figure 1:
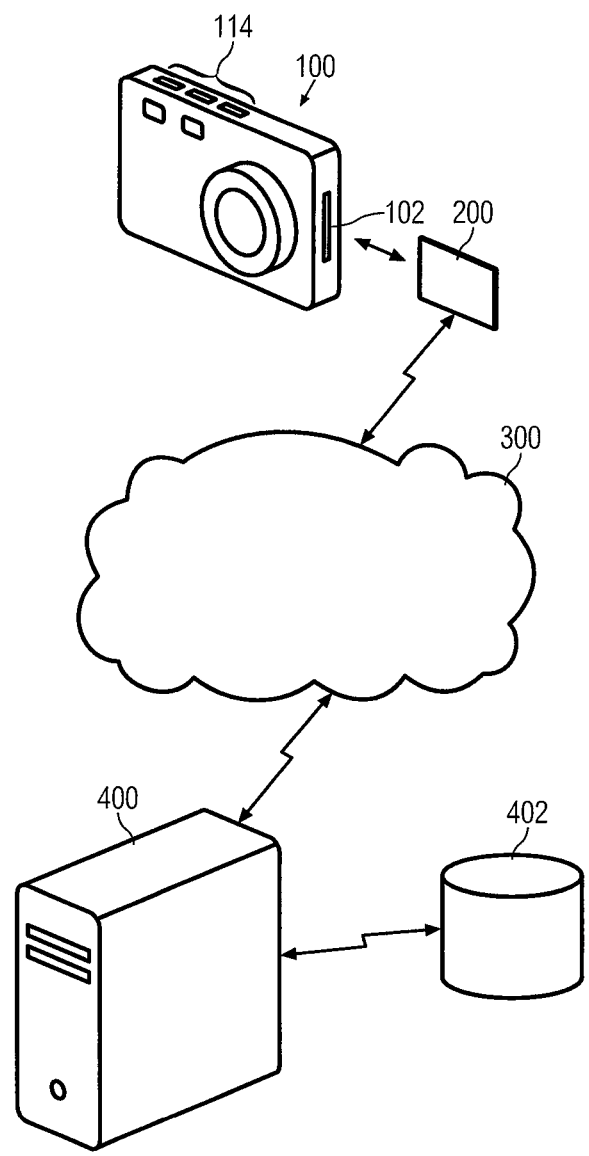
FIG. 1 is a schematic view of an exemplary system of a memory card connectable to a host apparatus to enable image data captured by the host apparatus to be converted.
Figure 2:
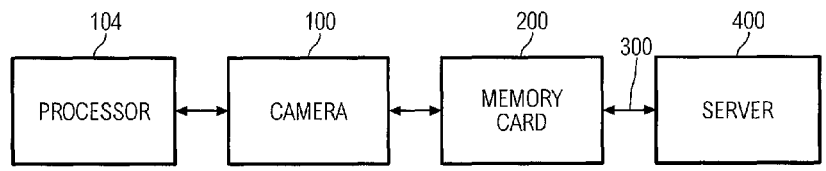
FIG. 2 is a block diagram illustrating the exemplary system of FIG. 1.
Figure 3:
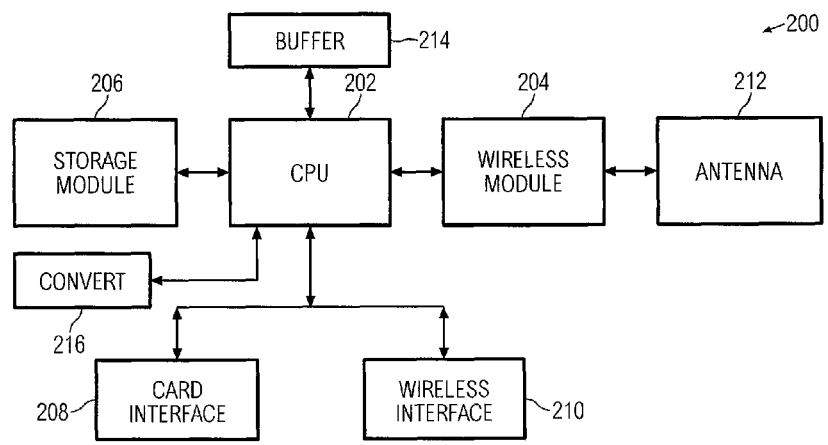
FIG. 3 is an illustration of the memory card of FIG. 1.
Figure 4:
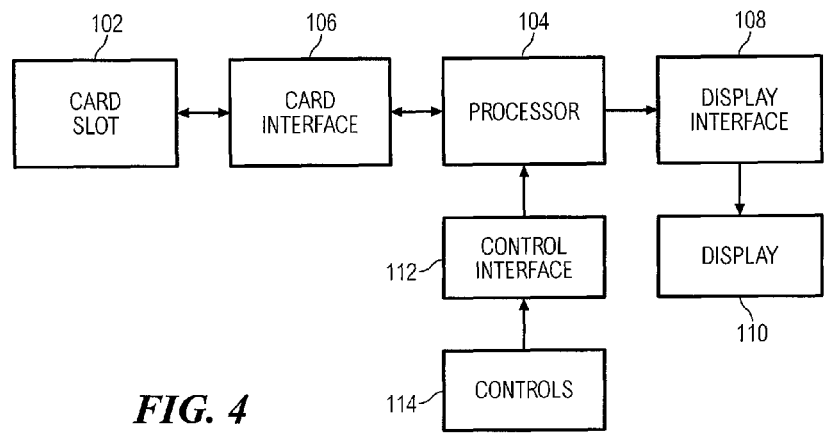
FIG. 4 is an illustration of the processor of the host device of FIG. 1.
Figure 5:
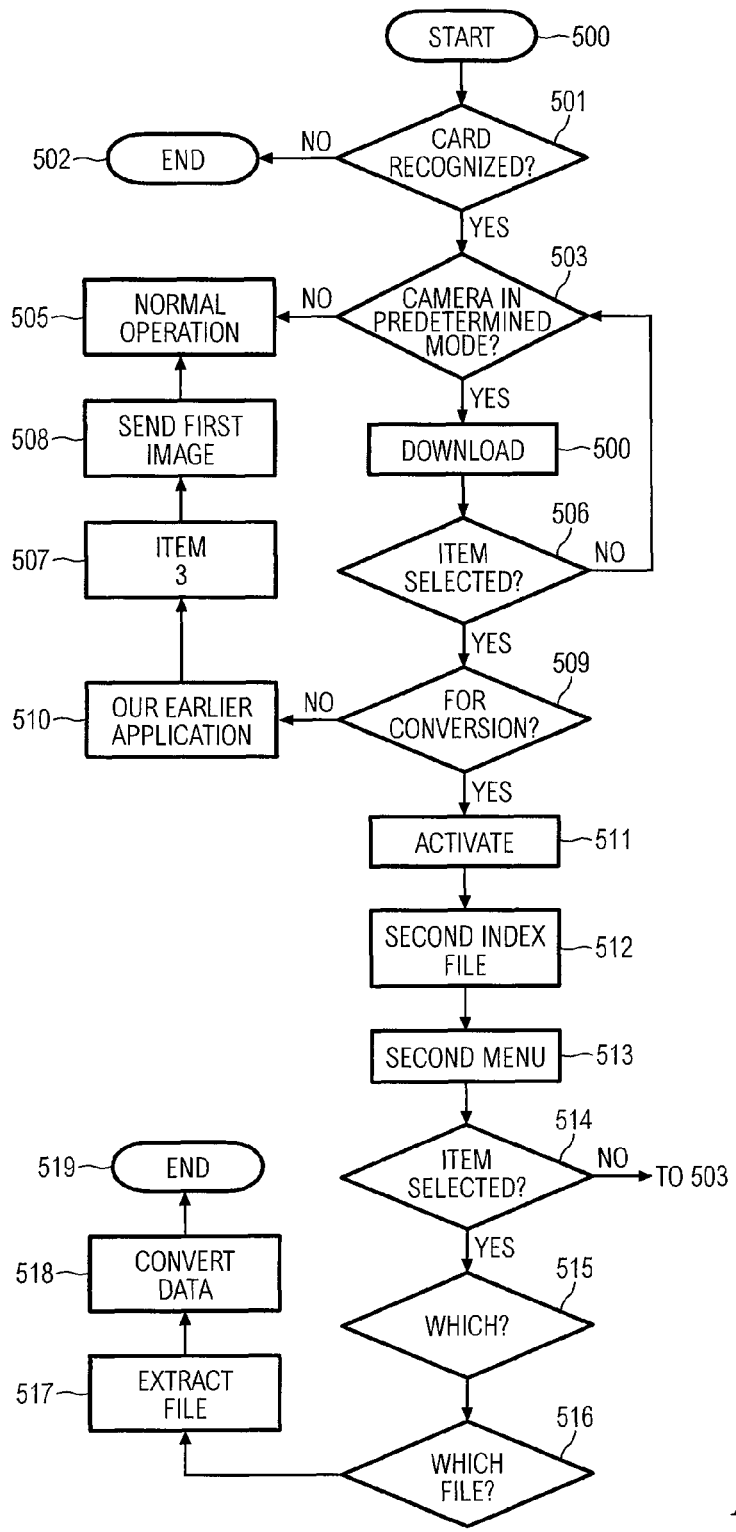
FIG. 5 is a flow chart for the operation of the exemplary embodiment of FIGS. 1 to 4.

The memory card 200 is shown in FIG. 3 and may be in accordance with one or more of our earlier applications and may have wireless transceiving capability in accordance with our earlier applications.

The memory card 200 has a central processor 202, a wireless transceiver module 204 operatively connected to the central processor 202, and a storage module 206 operatively connected to the central processor 202. The central processor 202 has a card interface 208 as well as a wireless interface 210. The wireless transceiver module 204 also has an antenna 212. The CPU 202 has a buffer 214 to enable the buffering of data particularly when the wireless transceiver module 204 is sending or receiving data. In addition the CPU has a conversion module 216 for converting data such as, for example, converting an image captured or otherwise received by the digital camera 100.

The digital camera 100 has an inbuilt processor 104 with a card interface 106 for interfacing with the memory card 200 when inserted into slot 102. The inbuilt processor 104 also has a display interface 108 for controlling the display screen 110 of the camera 100. Furthermore, the inbuilt processor 104 has a control interface 112 for enabling the camera control buttons and so forth 114 to be used to control the operation of the camera 100. The inbuilt processor 104 is incapable of independently exporting digital data externally of the camera 100. By independently exporting it is meant that the processor 104 requires the camera 100 to be operatively connected to an intelligent host such as a computer that has the relevant operative software to enable the export of the data to the computer from the camera, the exporting being under the control of the computer. The normal operation of the camera 100 is under the control of the inbuilt processor 104.

The inbuilt processor 104 is also incapable of independently importing digital data from externally of the camera 100. By independently importing it is meant that the processor 104 requires the camera 100 to be operatively connected to an intelligent host such as a computer that has the relevant operative software to enable the export of the data to the camera from the computer (i.e. import of the data by the camera from the computer), the exporting/importing being under the control of the computer.

Due to the card interface 208, whenever memory card 200 is engaged in the slot 102 of the camera 100 (500), the card interface 106 sees the memory card 200 as a normal memory card and will interface with it in the usual manner for transferring image and/or audio data from the inbuilt processor 104 to the memory card 200 (501). If the card 200 is not of a category recognised by the camera 100, it will display an error message in the normal manner and the process ends (502).

Once the initial connection between the inbuilt processor 104 and the card 200 is concluded, and upon the camera control being set to a predetermined mode such as, for example, "view" (or its equivalent such as, for example, "play" or "display" or "convert data") (503), the inbuilt processor 104 downloads from card 200 the first image file for display on the display 110 in accordance with normal operations. The central processor 202 then sends to the display interface 108 an index image file containing a first menu (504), with the navigation controls of controls 114 being able to be used in the normal manner for controlling the displayed menu. The first menu will contain a series of first items for determining the future performance of the camera 100. Each of the items of the first menu is a separate image within the index image file. The first menu items may include, for example:
1. transfer data
2. wireless detect
3. view image
4. convert data.

If at (503) the camera 100 is not set to the predetermined mode—i.e. is in "view" or its equivalent—the memory card 200 and the inbuilt processor 104 operate in the normal, known manner (505) under the operation of the inbuilt processor 104.

If the camera 100 is set to the predetermined mode, one of the displayed items must then be selected (506). As each item in the menu is a separate image, selecting one item in the menu list is selecting a separate image. Therefore, the controls 114 used must be such that the processor 104 can send an instruction to the central processor 202. There are normally two such instructions when in the view mode—"next" (send next image) and "delete" (delete this image). As "next" is required for the following operations, the "delete" function can be used. However, when the camera 100 is in the "view" mode AND if either "transfer data", "wireless detect" or convert data is selected from the first menu items given above, the central processor 202 will interpret "delete" as "select". When the "send first image" instruction is sent by the processor 104 and is received by memory card central processor 202 (504), the central processor 202 recognizes that the camera 100 is in the "view" mode as this is the only time such an instruction is received.

As each of the first menu items is a separate image, by using "delete" not only is an instruction sent from processor 104 to central processor 202, but the instruction contains an identifier of the image to enable the central processor 202 to know which image is to be deleted.

The central process 202 receives the instruction and, after confirming that the predetermined mode has been selected AND that the image selected is either (1), (2) or (4) from the image index file, the central processor 202 treats the "delete" instruction as "select".

The central processor 202 will then take the necessary action depending on whether first menu item 1, first menu item 2 or first menu item 4 was selected.

A query is raised (509) to determine if the first menu item selected is item 4 for the conversion of data. If not, it must be item 1, 2 or 3. If item 1 or 2 is selected in the normal manner using controls 114 the method proceeds in accordance with the method of one of our earlier applications (510). If item 3 is selected in the normal manner using controls 114 (507), the central processor 202 will treat the instruction in the normal manner and send the first image file from the storage module 206 (508) and the camera 100 and memory card 200 will continue to operate in the normal manner (505). If at (509) the first menu item selected is for conversion, it could be item 1 or item 2. So a second query is raised (510) to determine if item 1 or item 2 was selected.

If at 510 item 4 was selected, the central processor 202 will activate the conversion module 216 (511) and a second index image file is downloaded from the central processor 202 to the display 110 (512). The second index image file contains a second menu list (513). The second index image file may be the same as the first index image file, or may be different. Each item of the second menu list is also a separate image and has its own identifier. The second menu list may be the same as the first menu list, or may be different. The second menu list may include items such as, for example:
1. transfer data
2. wireless detect
3. view image
4. convert image.

Alternatively, it may be one or more of:
1. convert to VGA
2. convert jpg to pdf
3. convert image to text
4. authentication.

Whichever item is selected from the second menu list at (514) the central processor queries which is selected at (515). The relevant conversion is activated and a further query is raised to determine the file or files to be converted (516). Once selected, the relevant file or files are extracted (517) from the storage module 206 and converted (518). The process then ends (519). The converted file may be stored in the storage module in addition to or in place of the original file.

The actual conversion may be by any known and suitable conversion application such as, for example, any known optical character recognition application.

Figure 6:
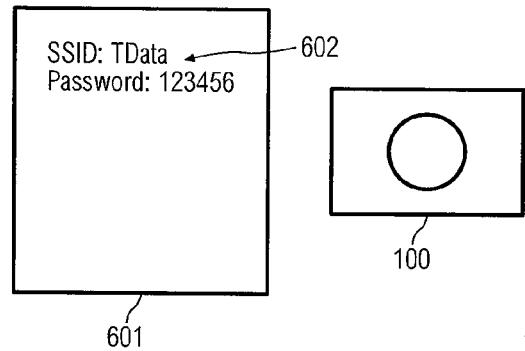
FIG. 6 is an illustration of a use of the exemplary embodiment.

In FIG. 6 is shown the use of this method for authentication or security purposes. This is to allow only authorised users to use the digital camera 100. On a sheet of paper or other suitable writing surface 601, is written at least one, but preferable two, items 602. As illustrated they are the SSID: TData, and the password or code: 123456. The digital camera 100 is then used to take an image of the items 602 as written. Using the method as described above the memory card 200 converts the image data to text. It can then be processed by the central processor 204 and/or the processor 104 and compared with reloaded and stored secure SSID and password or pass code. If in agreement, the camera 100 can be operated in the normal manner and/or the memory card 200 operated in the normal manner. I this way, authentication is required for use of the digital camera 100 and/or the memory card 200. Once authenticated, the original image file and the converted text file may be automatically deleted, if required or desired.

Figure 7:
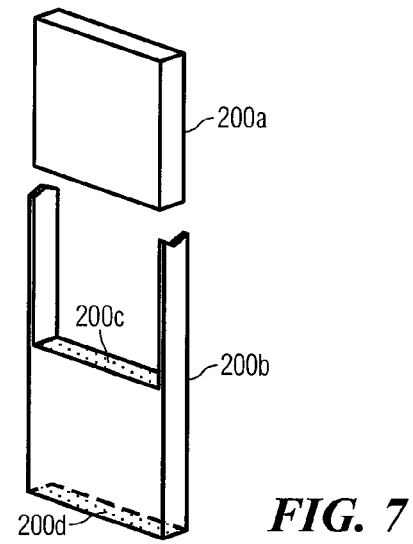
FIG. 7 is an indirect operative engagement using an adapter.
Figure 8:
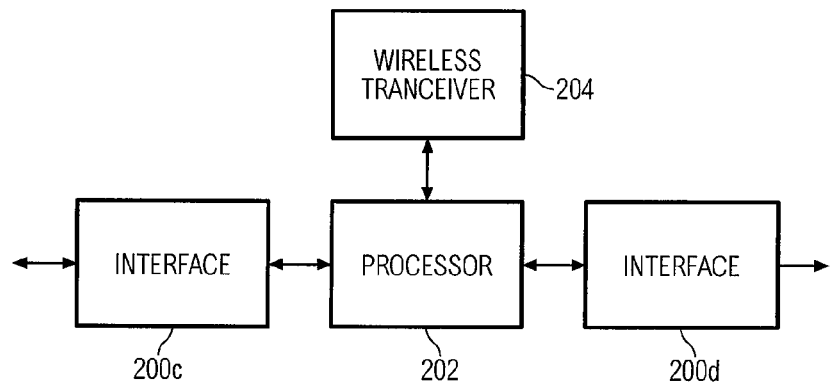
FIG. 8 is a block diagram of an exemplary adapter of FIG. 7.

FIGS. 7 and 8 illustrate an exemplary form of an indirect operative engagement. The methodology is the same as that for FIGS. 1 to 6. Here, the memory card 200 comprises a memory card unit 200a and an adapter 200b. The adapter 200b is configured to receive therein the memory card unit 200a for operative engagement therewith; and to operatively engage the digital camera 100 via the slot 102 as is described above. The adapter 200b may be of known construction, form factor and operation and has a first interface 200c for operative engagement with the memory card unit 200a, and a second interface 200d for operative engagement with the digital camera 100 via the slot 102. All relevant functionality is in the memory card unit 200a.

Alternatively, and as shown in FIG. 8, at least one functional component and/or functionality, but preferably two functional components and/or functionalities, of the memory card 200 is in the adapter 200b. As shown, the wireless transceiver module 204 and the central processor 202 and all of their functionalities are in the adapter 200b and are not in the memory card unit 200a. However, the invention is not limited to having both the wireless transceiver module 204 and the central processor 202 in the adapter 200b and not in the memory card unit 200a. Either or both of them may be in the adapter 200b. If only one of them is in the adapter 200b, the other will be in the memory card unit 200a. In this way the memory card unit 200a may be of relatively standard construction and operation.

This will have applicability where the memory card unit 200a, for example, is a micro SD card and the slot 102 is to receive an SD card of standard form factor. The adapter 200b will then be of a form factor the same as a standard SD card.

Whilst the foregoing description has described exemplary embodiments, it will be understood by those skilled in the technology concerned that many variations in details of design, construction and/or operation may be made without departing from the present invention.

The invention claimed is:

1. A method of converting digital data using a memory card operatively engaged with a digital camera having control buttons but that does not have a keyboard or keypad, the memory card comprising a central processor, a conversion module and a storage module, the storage module for storing the digital data as captured by the digital camera as a plurality of files; the method comprising:
   placing the digital camera in a predetermined mode;
   sending a first index image file to the digital camera from the memory card, the first index image file comprising a plurality of first menu items, wherein each first menu item is a separate image and selecting one of the first menu items is selecting a separate image; and
   wherein the selection of one of the first menu items with the control buttons activates the conversion module in the memory card which enables the selection and conversion of at least one of the plurality of files.

2. A method as claimed in claim 1, wherein the conversion is selected from the group consisting of:
   an image to text;
   one format to another;
   jpg to pdf;
   pdf to jpg;
   an image from one resolution to another;
   a high resolution image to standard definition VGA resolution;
   image to text for security; and
   image to text for authentication.

3. A method as claimed in claim 1, wherein the memory card is configured to physically and operatively engage in and with the digital camera, and to operatively connect with an inbuilt processor of the digital camera.

4. A method as claimed in claim 1, wherein the digital data is selected from the group consisting of: image data, audio data, image and audio data, video data, and audio and video data.

5. A method as claimed in claim 1, wherein the control buttons of the digital camera are able to be used to control the central processor only when the digital camera is in the predefined mode.

6. A method as claimed in claim 1, wherein the first index image file is displayed on a screen of the digital camera.

7. A method as claimed in claim 1, wherein upon the control buttons being used to select one of the first menu items, the inbuilt processor sends an instruction to the central processor, the instruction containing an identifier of the selected first menu items.

8. A method as claimed in claim 7, wherein the central processor treats the instruction as "select".

9. A method as claimed in claim 8, wherein the instruction is "delete".

10. A method as claimed in claim 1, wherein the conversion module enable the selection and conversion of at least one of the plurality of files by sending a second index image file from the memory card to the digital camera, the second index image comprising a second menu list; and wherein upon a member of the second menu list is selected a relevant conversion is activated and a further query is raised to determine the at least one of the plurality of files to be converted and once the at least one of the plurality of files are selected, the selected at least one of the plurality of files are extracted and converted.

11. A method as claimed in claim 10, wherein each member of the second menu list is also a separate image and has its own identifier.

12. A method as claimed in claim 10, wherein the second menu list comprises:
   image to text;
   one format to another;
   jpg to pdf;
   pdf to jpg;
   image from one resolution to another;
   high resolution image to standard definition VGA resolution;
   image to text for security; and
   image to text for authentication.

13. A method as claimed in claim 12, wherein the digital data comprises an image of at least one item written on a writing surface, the memory card converting the image data to text; the text being processed and compared with a pre-loaded and stored at least one item for at least one of: authentication, and security, of at least one of the digital camera and the memory card.

14. A method as claimed in claim 1, wherein the operative engagement is direct or indirect.

15. A method as claimed in claim 14, wherein the operative engagement is indirect and the memory card comprises a memory card unit and an adapter configured to receive therein the memory card unit; the adapter being further configured to operatively engage the digital camera.

16. A method as claimed in claim 15, wherein the adapter comprises at least one functional component and functionality of the memory card.

17. A method as claimed in claim 16, wherein the at least one functional component comprises at least one of the central processor and a wireless transceiver module.

18. A memory card for converting digital data when operatively engaged with an digital camera having control buttons but that does not have a keyboard or keypad, the memory card comprising a central processor, a conversion module and a storage module, the storage module being for storing the digital data as captured by the digital camera as a plurality of files; the memory card configured to send a first index image file to the digital camera when the digital camera is in a predetermined mode, the first index image file comprising a plurality of first menu items, wherein each first menu item is a separate image and selecting one of the first menu items is selecting a separate image; and wherein the selection of one of the first menu items with the control buttons activates the conversion module which enables the selection and conversion of at least one of the plurality of files.

19. A memory card as claimed in claim 18, wherein the memory card further comprises a memory card unit and an adapter configured to receive therein the memory card unit; the adapter being further configured to operatively engage the apparatus.

20. A memory card as claimed in claim 19, wherein the adapter comprises at least one functional component and functionality of the memory card.

21. A memory card as claimed in claim 20, wherein the at least one functional component comprises at least one of the central processor and a wireless transceiver module.

\* \* \* \* \*